United States Patent
Gloss et al.

(10) Patent No.: US 9,551,473 B2
(45) Date of Patent: Jan. 24, 2017

(54) LIGHTING DEVICE (71) Applicant: Varroc Lighting Systems, s.r.o., Senov u Noveho Jicina (CZ)

(72) Inventors: Tomas Gloss, Vitkov (CZ); Petr Ferbas, Bohunovice (CZ)

(73) Assignee: VARROC LIGHTING SYSTEMS, S.R.O. (CZ)

( * ) Notice: Subject to any disclaimer, the term of this patent is extended or adjusted under 35 U.S.C. 154(b) by 0 days.

(21) Appl. No.: 14/294,269

(22) Filed: Jun. 3, 2014

(65) Prior Publication Data
US 2015/0092433 A1   Apr. 2, 2015

(30) Foreign Application Priority Data
Sep. 30, 2013   (CZ) ............................... PV 2013-755

(51) Int. Cl.
*F21V 7/04*   (2006.01)
*F21S 8/10*   (2006.01)
*F21V 8/00*   (2006.01)

(52) U.S. Cl.
CPC .......... *F21S 48/1241* (2013.01); *F21S 48/215* (2013.01); *F21S 48/2237* (2013.01); *F21S 48/2268* (2013.01); *F21S 48/2281* (2013.01); *F21S 48/2287* (2013.01); *G02B 6/001* (2013.01); *G02B 6/0061* (2013.01)

(58) Field of Classification Search
CPC .... G02B 6/001; G02B 6/0061; F21S 48/1241; F21S 48/215; F21S 48/2237; F21S 48/2268; F21S 48/2281; F21S 48/2287
USPC ......................................... 362/511, 551, 560
See application file for complete search history.

(56) References Cited

U.S. PATENT DOCUMENTS

| 6,286,970 | B1* | 9/2001 | Egawa et al. ................. 362/608 |
| 6,535,667 | B1* | 3/2003 | Gozum et al. .................. 385/31 |
| 7,228,052 | B1* | 6/2007 | Lin .......................... F21K 9/52 |
|           |     |        | 362/326 |
| 8,246,228 | B2* | 8/2012 | Ko .............................. 362/559 |
| 2002/0131275 | A1* | 9/2002 | Yamamoto et al. .......... 362/555 |
| 2008/0002421 | A1* | 1/2008 | Tamaki et al. ................ 362/552 |
| 2008/0198624 | A1* | 8/2008 | Lundin et al. ................ 362/615 |
| 2009/0052172 | A1* | 2/2009 | Sheng ........................... 362/240 |

(Continued)

FOREIGN PATENT DOCUMENTS

| DE | 10219738 A1 | 11/2003 |
| DE | 10317062 A1 | 10/2004 |

(Continued)

OTHER PUBLICATIONS

German Office Action for DE102014113318.8 dated Nov. 2, 2015.

*Primary Examiner* — Bryon T Gyllstrom
(74) *Attorney, Agent, or Firm* — Cantor Colburn LLP (57) ABSTRACT

A lighting device for a motor vehicle includes a light source for sending out a light beam. The lighting device also includes a lightguide of elongated shape made of a plastic, primarily transparent material for guiding the light beam, while a portion of a mantle of the lightguide forms an exit surface for emergence of rays of light of the light beam, wherein another portion of the mantle of the lightguide opposite the exit surface is at least partly provided with a diffuse means formed by a nontransparent coating or foil pressed against the mantle of the lightguide, or joined to a diffuse means of the plastic primarily nontransparent material in the process of injection molding of the plastic.

12 Claims, 4 Drawing Sheets

(56) References Cited

U.S. PATENT DOCUMENTS

| | | |
|---|---|---|
| 2009/0086502 A1* | 4/2009 | Chang .......................... 362/559 |
| 2009/0154173 A1* | 6/2009 | Huang et al. ................. 362/373 |
| 2010/0097792 A1* | 4/2010 | Kabuki et al. ........... 362/217.05 |
| 2010/0110717 A1* | 5/2010 | Chen ............................ 362/551 |
| 2010/0226145 A1* | 9/2010 | Yu ............................... 362/561 |

FOREIGN PATENT DOCUMENTS

| | | |
|---|---|---|
| DE | 102005014584 A1 | 11/2005 |
| DE | 102005035063 A1 | 2/2007 |
| DE | 102006016656 A1 | 10/2007 |
| DE | 102006017960 A1 | 10/2007 |
| DE | 102007005779 A1 | 8/2008 |
| EP | 1775511 A1 | 4/2007 |

* cited by examiner

LIGHTING DEVICE

CROSS-REFERENCES TO RELATED APPLICATIONS

This patent application claims priority to Czech Republic Patent Application Serial No. PV 2013/755 filed on Sep. 30, 2013, which is incorporated herein by reference in its entirety.

BACKGROUND OF THE INVENTION

The invention pertains to a lighting device, especially for motor vehicles, which is comprised of a light source for sending out a light beam and a lightguide of elongated shape made of a plastic, primarily transparent material for guiding the light beam, while a portion of the mantle of the lightguide forms the exit surface for emergence of the rays of light.

A lighting device formed by a light guide of elongated shape, in whose body is arranged a light source and whose mantle in a particular portion lets through light and thus forms an exit surface for emergence of the light rays, is known from document EP1775511. Opposite the exit surface is arranged a reflective surface of the mantle, which is provided with optical elements (prisms). One portion of the rays passing through the lightguide is reflected from the reflection side (of the optical elements) in the direction of the outlet side of the lightguide and emerges to the outside through the outlet side of the lightguide. A second portion of rays passes through the reflection side and out from the lightguide, impinges upon and is bounced back from a diffuse part arranged outside the lightguide, passes through the reflection side, again enters into the lightguide and then emerges through the outlet side from the lightguide and to the outside. The lighting device according to document EP1775511 is unsuitable especially on account of the air gap between the lightguide and the diffuse part, which results in Fresnel losses at the interface between the diffuse part and the lightguide. If moreover the diffuse part is metallized, the efficiency of the system is further reduced due to the limited reflectivity of the metallized surface. Another document, DE102007005779A1, specifies a lighting device with a lightguide of elongated shape, provided in one peripheral part with projections, which reflect the rays of the light beam passing through the lightguide in the direction toward the opposite peripheral part of the lightguide, through which the rays pass to the outside and are finally reflected by a reflector in the direction of the movement of the vehicle. The lightguides known thus far for motor vehicles thus emit a light image which emerges by the outlet side of the mantle of the lightguide as a result of reflection from the optical elements arranged primarily on the side of the lightguide opposite the outlet side. The contours of the optical elements are quite visible in the emerging light image and they form undesirable discontinuous spots or sections. While making the optical elements smaller somewhat reduces the discontinuities visible in the light image, it does so only in a certain narrow range of the angle of observation. The lighting devices of the same kind that are known thus far also have a complicated design and installation, especially because they are composed of many parts. Each part requires its own press molds. Finally, assemblages of lighting devices of multiple parts are disadvantageous because they have relatively large dimensions, which limits their use in a vehicle frame.

SUMMARY OF THE INVENTION

In an exemplary embodiment, a lighting device for a motor vehicle is disclosed. The lighting device includes a light source for sending out a light beam. The lighting device also includes a lightguide of elongated shape made of a plastic, primarily transparent material for guiding the light beam, while a portion of a mantle of the lightguide forms an exit surface for emergence of rays of light of the light beam, wherein another portion of the mantle of the lightguide opposite the exit surface is at least partly provided with a diffuse means formed by a nontransparent coating or foil pressed against the mantle of the lightguide, or joined to a diffuse means of the plastic primarily nontransparent material in the process of injection molding of the plastic.

The goal of the invention is to provide a lighting device of the given kind which eliminates the disadvantages of the lighting devices known thus far and whose lightguide produces a homogeneous lighting effect, in which a perfectly uniform distribution of brightness is accomplished along the entire length and in which there are no visible optical elements. Another goal of the invention is that the luminous surface of the lightguide is more uniform from larger angles of observation. Another goal of the invention is a lightguide having a homogeneous light image even for a spatial shape and especially a discontinuous shape such as a right-angled bending of the lightguide. Finally, a goal of the invention is a lightguide of the desired properties whose design and manufacture are simple and whose operation is reliable.

These and other advantages and features will become more apparent from the following description taken in conjunction with the drawings.

BRIEF DESCRIPTION OF THE DRAWINGS

The lighting device according to the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

The drawbacks of the prior art are eliminated and the goal of the invention accomplished by a lighting device formed by a light source for sending out a light beam and a lightguide of elongated shape made of a plastic, primarily transparent material for guiding the light beam, while a portion of the mantle of the lightguide forms the exit surface for emergence of the rays of light and a portion of the mantle of the lightguide opposite the exit surface is according to the invention at least partly provided with a diffuse means, formed by a nontransparent coating or foil pressed against the mantle of the lightguide or joined to a diffuse means of the plastic primarily nontransparent material in the process of injection molding of the plastic.

Advantageously, the part of the mantle of the lightguide 3 provided with the diffuse means 11, 12, 13 may form a diffuse surface 14, whose width (s) is variable in the direction of passage of the light beam 2 through the lightguide 3 from the light source 1, in particular it can get bigger, or it can form a diffuse surface 14 in the form of closed shapes separated from each other. Advantageously, the portion of the mantle of the lightguide 3 forming the exit surface 4 for emergence of the light rays can have a cylindrical shape at least in the region of the diffuse surface 14. Advantageously, the lightguide 3 can have the shape of a slab 5 with one exit surface 8 for emergence of the light rays, and the diffuse surface 14 formed by the diffuse means 11, 12, 13 on the opposite back surface 9 can advantageously be a smaller part of the opposite back surface 9. The material of the lightguide 3 advantageously contains a predetermined quantity of additive to decrease the direct transmission of light and increase the lateral component of the light beam, in dependence on the length of the lightguide.

The lighting device according to the invention is based on the fact that the device produces a homogeneous light effect with a perfectly uniform distribution of brightness along the entire length, it does not reveal optical elements that disturb the homogeneous light effect, the luminous surface of the lightguide is more uniform from larger angles of observation, it has a homogeneous light image even for a spatial shape and especially a discontinuous shape such as a right-angled bending of the lightguide, and its design and manufacture are simple and its operation is reliable.

Figure 1A:
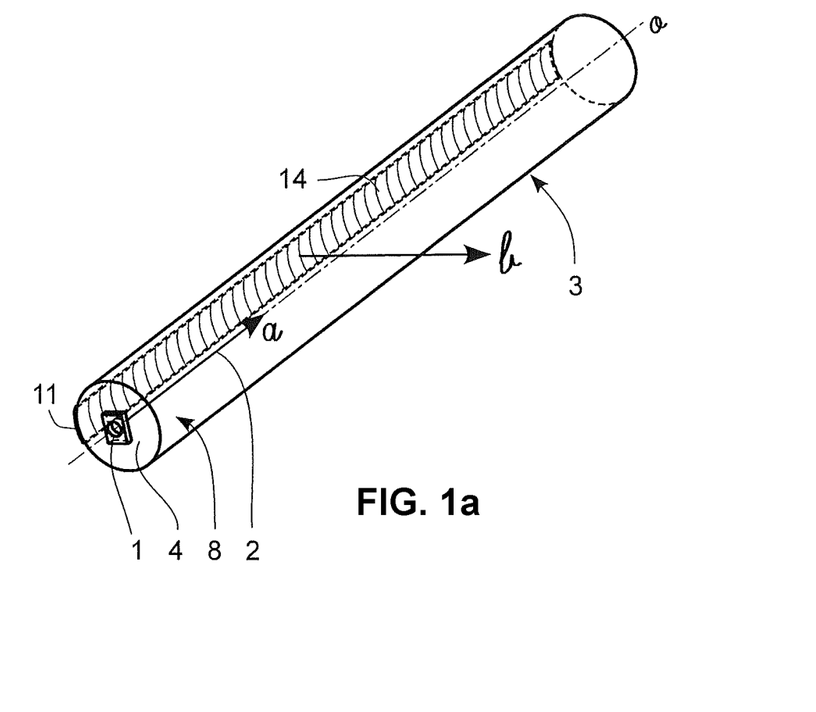
FIG. 1a comprises the lighting device with lightguide with diffuse means formed by a nontransparent coating, FIG. 1b comprises the lighting device with lightguide with diffuse means formed by a nontransparent foil, FIG. 1c comprises the lighting device with lightguide with diffuse means formed by a nontransparent injection molded plastic, FIG. 2 comprises the lighting device with lightguide of slab shape, FIG. 3 comprises the shape of the diffuse surface of the lighting device in dependence on the lengthwise shape of the cylindrical lightguide, FIG. 4 comprises a cross section through the lightguide of cylindrical shape, and FIG. 5 comprises a diagram of the propagation of the light rays in the lightguide of the lighting device according to the invention.

According to FIG. 1a, the lighting device according to the invention is composed of a lightguide 3 made of plastic transparent material of cylindrical shape, at whose end 4 is arranged a light source 1 for emitting a light beam 2 in direction "a" of the lightguide 3. The mantle of the cylindrical lightguide 3 formed from plastic transparent material is provided with a diffuse means 11 in the longitudinal direction, in a portion of its circumference, formed by a coating or spraying on of nontransparent paint, which forms the diffuse surface 14. The side of the mantle of the cylindrical headlamp opposite the nontransparent coating or spray is the exit side 8.

Figure 1B:
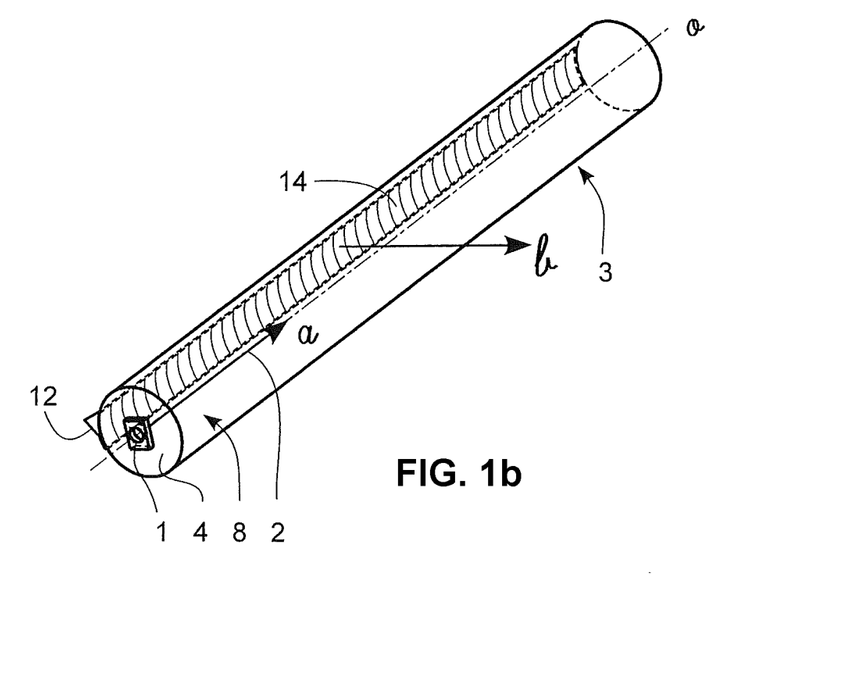

According to FIG. 1b, the lightguide 3 made of plastic transparent material shown in FIG. 1a is provided with a diffuse means 12 formed by a foil of nontransparent material instead of a coating or spray.

Figure 1C:
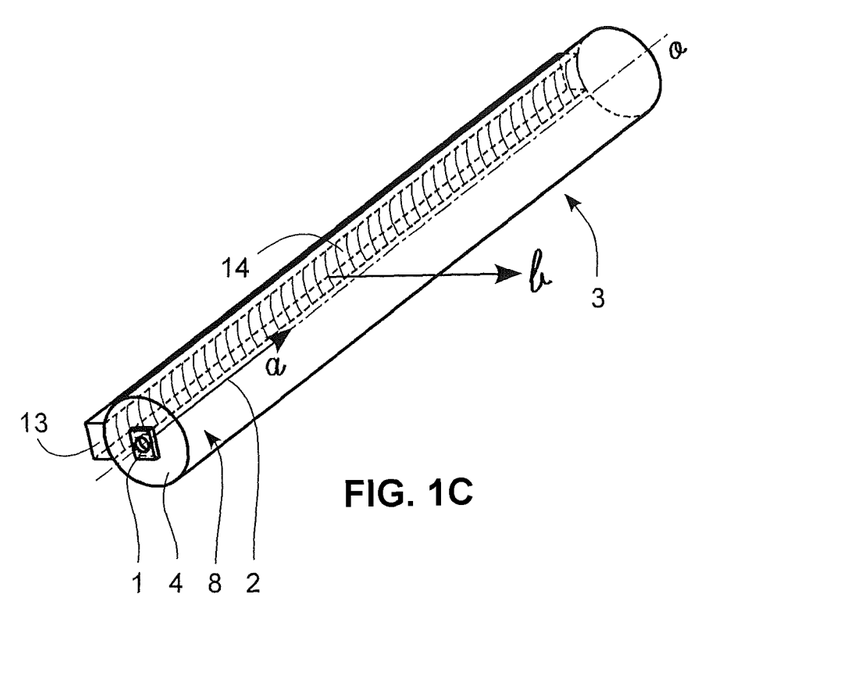

According to FIG. 1c, the lightguide 3 made of plastic transparent material shown in FIG. 1a is provided with a diffuse means 13 of predominantly nontransparent plastic material which is joined to the material of the lightguide 3 in the plastic injection molding process, instead of a coating or spray of nontransparent material.

According to FIG. 1c, the lightguide 3 made of plastic transparent material shown in FIG. 1a is provided with a diffuse means 13 of predominantly nontransparent plastic material which is joined to the material of the lightguide 3 in the plastic injection molding process, instead of a coating or spray of nontransparent material.

The light beam 2 passes through the transparent material of the lightguide 3 in direction "a" and is progressively broken down into lateral components, which weakens the advancement of the light beam 2. The lateral components of the light beam 2 in the slab lightguide 3 emerge in disorderly manner through the surface 8. The lateral components of the light beam 2 which are absorbed by the diffuse surface 14 make this diffuse surface 14 visible.

Figure 2:
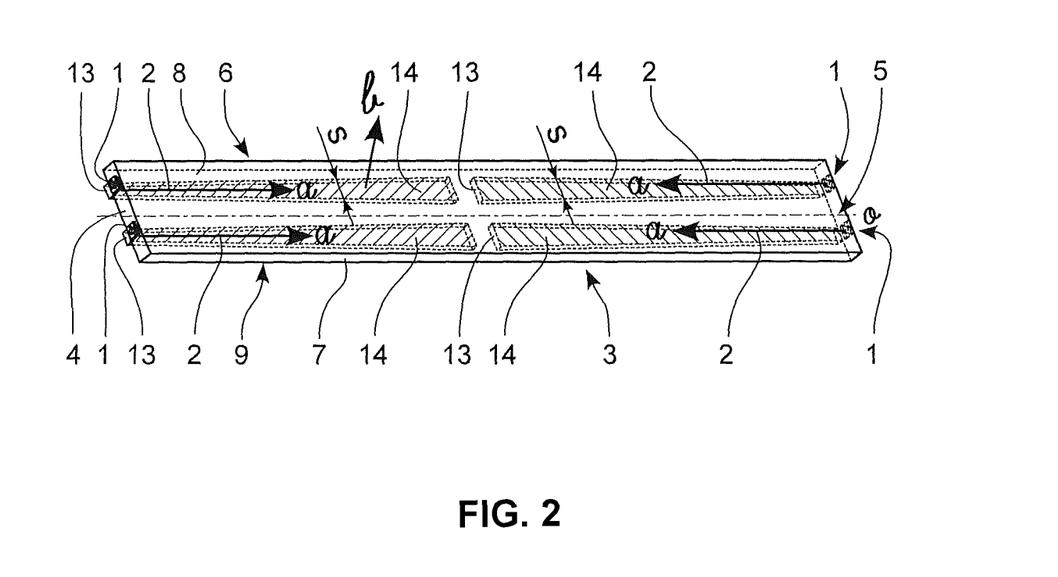

According to FIG. 2, the lighting device according to the invention consists of a lightguide 3 of plastic transparent material, in the present case having the shape of an elongated slab, whose mantle is formed by the opposite surfaces 8, 9 and the lateral sides 6, 7. At both end faces 4, 5 of the slab are attached light sources 1 to emit light beams 2 into the slab in the direction "a" of advancement of the light beams, which is parallel with the axial curve "o" of the elongated slab. Through the surface 8 of the slab lightguide 3 the light rays emerge from the lightguide 3 in the light ray exit direction indicated as "b". On the surface 9 opposite the surface 8 of the slab lightguide 3 is arranged a diffuse means 13 of plastic predominantly nontransparent material, joined to the surface 9 of the transparent slab lightguide 3 in the injection molding process of the plastic. The joint between the diffuse means 13 and the slab lightguide 3 is formed by the diffuse surface 14, which in the present case has the shape of a wedge, i.e., its width "s" increases in the direction "a" of passage of the light beam through the transparent material of the slab lightguide 3. The diffuse surface 14 expands in linear fashion from the light source 1 in the direction "a" of passage of the light beam 2 through the lightguide 3. According to FIG. 2, light sources 1 are arranged opposite each other on both end surfaces 4, 5 of the slab lightguide 3 and the diffuse surfaces 14 have the form of mutually separated closed shapes arranged in directions from both end surfaces 4, 5. An alternative embodiment of the slab lightguide 3 can have light sources 1 arranged only in the direction from one end of the lightguide. The light beam "a" then advances in only one axial direction. Because diffuse means are coordinated with the light sources, in such a case the diffuse means would be arranged in the direction from one end of the lightguide along the entire length of the lightguide. The arrangement of the light sources 1 opposite each other on both sides of the lightguide 3, as illustrated in FIG. 2, is more advantageous than the alternative embodiment of the diffuse surface only at one end of the opposite back surface 9, since in the case of shapes arranged at either end of the lightguide opposite each other the diffuse surfaces 14 can be shorter in the direction of the longitudinal axis than would be a single diffuse surface 14 arranged only in one axial direction from one end 4, 5 of the lightguide 3.

The light beam 2 moves in direction "a" through the transparent material of the slab lightguide 3 and is progressively broken down into lateral components, which weakens the progress of the light beam 2. The lateral components of the light beam 2 in the slab waveguide 3 exit in disorderly manner by the surfaces 8, 9 to the outside. The lateral components of the light beam 2 which are absorbed by the diffuse surface 14 make this diffuse surface 14 visible. To outcouple a larger amount of light through the exit surface, it is advisable to widen the diffuse surface 14, to outcouple a smaller amount of light it is advisable to narrow the diffuse surface 14. Since the progression of the light beam 2 is weakened as a result of the breakdown into lateral components, it is advisable for the diffuse surface 14 to widen in the direction of advancement "a" of the light beam, advantageously in linear fashion, as is illustrated in FIG. 2. Because absorption and outcoupling of light also occur along the lightguide, it is necessary to compensate for the loss of intensity of the light beam by progressive widening of the diffuse surface in the direction "a" of advancement of the light beam from the light source. If the lightguide is supplied by several sources, such as two at each end 4, 5 of the slab in FIG. 2, then the diffuse surface must be widest in the middle part of the lightguide (again depending on the shape and curvature of the bend).

The portion of the mantle of the lightguide 3 provided with the diffuse means 13 forms the diffuse surface 14 in the form of closed shapes that are separated from each other, which can also have a form other than that shown in FIG. 2. According to FIG. 2, the diffuse surface 14 formed by the diffuse means 13 on the opposite back surface 9 is a smaller portion of the opposite back surface 9. Therefore, the light rays of other light sources which can be advantageously positioned in front of the side 9 of the lightguide 3 in the exit direction "b" of the light rays can pass through the free portions of the surface 9 in the exit direction "b" of the light rays.

When manufacturing the lighting device according to FIG. 2, as mentioned above, one uses a two-component injection molding of plastic. For the injection molding of the plastic one uses material in the form of a granulation, which must first have its moisture content removed. This is generally done in the hopper of the injection press. After the drying, it is gathered up by an augur and taken to the plasticization unit, where it is heated to the appropriate injection molding temperature. Once the material is ready, it is injected under high pressure into the mold. For purposes of the invention, it is necessary to use a two-component injection, which means that the mold is rotary and has two cavities of different shape. After injecting the first part, which is usually the clear transparent part, the movable body of the mold rotates and finishes injecting the second nontransparent part of the product. Finally, it is necessary to cool the finished product in the mold down to operating temperature in order to remove it from the tooling. The injection molding process is cyclical and the duration of one cycle depends on the complexity and size of the plastic molding. Most of the time this cycle lasts on the order of a dozen seconds. At the time when the mold is opened, it is possible to insert special foil, which is then pressed against the plastic molding, as is shown in FIG. 1b. But this foil can advantageously be replaced with the diffuse means 13 of plastic predominantly nontransparent material joined to the surface 9 of the slab lightguide 3 in the process of injection molding of plastic and it will no longer be necessary to use a two-component injection molding.

Figure 3:
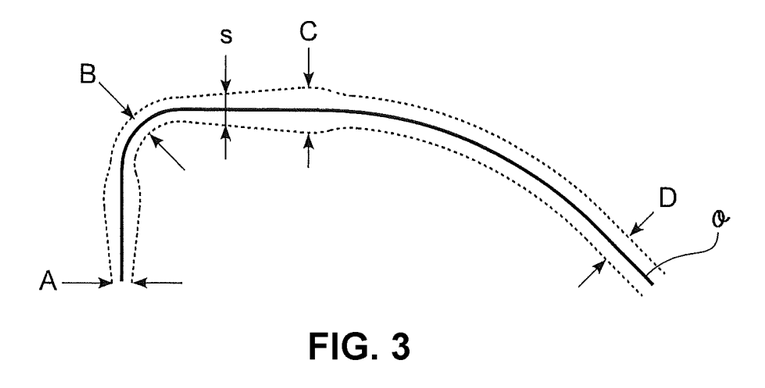

FIG. 3 illustrates a cylindrical lightguide by means of its axial line "o". From the shape of the curve depicting the axial line "o" of the lightguide it is evident that the shape of the lightguide is angled and includes a straight part A-B, a sharp curve B, another straight part B-C and a gentle curve C-D. The width "s" of the diffuse surface 14 is delimited by broken lines in the direction of advancement A-B-C-D of the light beam, which gradually widen from the axial curve "o" in the straight regions A-B and B-C, again come closer together before the regions B, D, and have unchanged short distance from the axial curve "o" in the regions B, C-D. The shape of the diffuse surface 14 of the lightguide 3 depends according to FIG. 3 on the longitudinal shape of the lightguide 3. The solid line is the axial curve of the lightguide of general shape. It has been found that bends in the lightguide 3 encourage spontaneous (unwanted) outcoupling of light, which is greater as the radius of the bend in the lightguide 3 is smaller. Therefore, one tries to compensate for the unwanted light outcoupling in places of bending of the lightguide 3 by locally decreasing the diffuse surface which outcouples the light. This corresponds to the variability in width "s" of the diffuse surface 14, which is needed to achieve the same degree of light outcoupling along the entire length of the lightguide 3. The light in the lightguide propagates by means of total reflection until a limit angle is exceeded and the light is outcoupled from the lightguide or until the ray of light impinges on the diffuse surface and is scattered into a pencil of rays (thanks to diffusion). And a portion of the light gets out from the lightguide in different directions, which dictates the greater homogeneity of the lightguide from several sides. The ratio between the diffuse surface and the surface of the transparent part must be chosen so that the light does not arrive at the end of the lightguide, which will depend on the profile, the length and the number of bends along the lightguide and their curvature.

Figure 4:
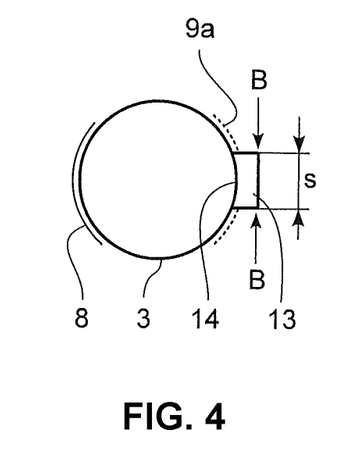

The diffuse surface and its shape are more visible to observers in lightguides of two-dimensional shape according to FIG. 2, which may be an unwanted characteristic when the width of the diffuse surface varies significantly or abruptly. The visibility of the change in width of the diffuse surface can be reduced by a suitable profile of the waveguide, as is illustrated in FIG. 4. According to FIG. 4, the lightguide 3 of transparent material has a circular cross section, to which is joined a diffuse means 13 of plastic nontransparent material. The circular profile of the transparent part of the lightguide acts like a lens, which seemingly increases the actual diffuse surface 14. As seen by the observer, however, the diffuse surface 14 appears much larger. If, for example, the cross section of the transparent part were rectangular, no magnifying effect would be achieved and any narrowing in width "s" of the diffuse surface 14 would be directly visible to the observer. The light rays emerge from the lightguide by the exit surface 8, which is opposite the diffuse surface 14. The exit surface 8 occupies a larger part of the circumference of the lightguide 3 than the diffuse means 13 with the diffuse surface 14. Thus, light rays coming from other light sources, such as the fog light or the brake light, can freely pass through the free surfaces 9a of the lightguide 3.

Figure 5:
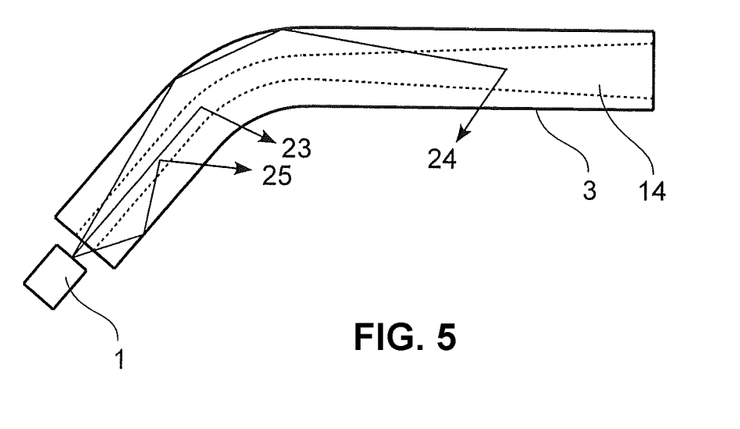

FIG. 5 shows a diagram of the propagation of a light ray in the lightguide of the lighting device according to the invention. As seen by an observer, the figure shows a lightguide 3 of transparent material, a diffuse surface 14, which is appropriately widened along the length of the lightguide, a light source 1 and light rays 23, 24, 25. The course of the light ray 23 represents an example when the light ray is totally reflected from the wall of the transparent lightguide 3, then reaches the diffuse surface 14 and is partly outcoupled from the lightguide 3 from the diffuse surface 14, while the remaining part of the light continues to propagate along the lightguide 3. The light ray 25 represents the case when the light ray is directly scattered by the diffuse surface 14 and is partly outcoupled from the lightguide 3, while the remaining portion continues to propagate through the lightguide 3. The ray 24 represents the case when the light ray is propagating by multiple total reflection in the direction from the source 1, then again reaches the diffuse surface 14 and is scattered.

The light beam can undergo mirror reflection according to the law of incidence and reflection, or diffuse reflection, when a reflection similar to a scattering in all directions occurs with regard to a large number of uneven fractional surfaces of incidence oriented in different directions, or the light beam can be and in practice is reflected in mixed fashion, one portion of the light beam undergoing mirror reflection and another being scattered. If the beam of parallel rays impinges on a predominantly uneven or rough surface of incidence, the rays are reflected in different directions and a diffuse reflection or scattering occurs. Scattered light does not cast sharp shadows and is subjectively more pleasing. The absorption effect of the diffuse surface smoothes out the light beam and makes it more uniform. The diffusion of light does not increase the luminosity, but instead decreases it by the smoothing out of peaks, and the amount of light produced by the luminous flux before and after diffusion is only moderately decreased. In classical lightguides without a diffuse surface, there is a directional outcoupling of light due to the optical elements. But these predominantly outcouple the light in a single direction and the lightguide is not visible from most angles of observation, i.e., it goes out. But thanks to the diffuse surface, the light is outcoupled in more angles of observation. The illuminating function of the lighting device according to the invention is thus evenly and steadily visible from many sides, not only when viewing in the axis of the automobile.

The material of the lightguide may advantageously contain preselected amounts of additive to decrease the direct transmissivity of light and increase the lateral component of the light beam. Additives of this kind which cause the rays of light in the transparent portion of a lightguide to be spatially scattered in all directions are in themselves known from the prior art. Thanks to the use of an additive, a greater homogeneity of light was achieved when viewed from more angles of observation. But the drawback is that there is a faster loss of light in the lightguide inside the material and thus it is not able to reach to the end of the lightguide. It is generally true that it is appropriate to use an additive for shorter lightguides, since the desired homogeneity will be achieved at shorter distance from the source, which means along the entire length of the lightguide; but in longer lightguides, the use of an additive is harmful, since there will occur outcoupling and absorption of light much sooner, before it can reach the end of the lightguide. The lightguide then "goes out" at the end furthest away from the source. To eliminate this drawback, the lightguide of the lighting device according to the invention can contain an additive to decrease the direct transmissivity of light and to increase the lateral component of the light beam, whose part by weight is chosen in advance depending on the size, i.e., length and width of the diffuse surface. The additive is already contained in the initial granulate for the injection molding of the lightguide, and therefore one can use different granulates for different lengths of lightguide or different shapes of diffuse surface of the lightguide. Thus, to a certain degree one can control the effectiveness of the additive and the intensity of increase of the lateral component of the light beam.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A lighting device for a motor vehicle, comprising:
a light source for sending out a light beam; and
a lightguide of elongated shape, the light source attached to an end of the lightguide, the lightguide comprising a plastic, primarily transparent material for guiding the light beam, while an outer surface portion of a mantle of the lightguide forms an exit surface for emergence of rays of light of the light beam, wherein another outer surface portion of the mantle of the lightguide opposite the exit surface comprises a diffuse means that forms a diffuse surface that extends continuously from the end to an opposite end of the lightguide, the diffuse surface formed by a nontransparent coating or foil pressed against the mantle of the lightguide, or a plastic primarily nontransparent material joined to the mantle, the diffuse surface having a width that varies along the lightguide from the end to the opposite end.

2. The lighting device according to claim 1, wherein the width of the diffuse surface both increases and decreases in a direction (a) of passage of the light beam through the lightguide from the light source.

3. The lighting device according to claim 1, wherein the width of the diffuse surface increases in a direction (a) of passage of the light beam through the lightguide from the light source.

4. The lighting device according to claim 1, wherein the lightguide has a shape of a slab with one exit surface for emergence of the light rays, and a diffuse surface formed by the diffuse means on the opposite outer surface is a smaller part of the opposite back surface.

5. The lighting device according to claim 1, wherein the portion of the mantle of the lightguide forming the exit surface for emergence of the light rays has a cylindrical shape at least in a region of the diffuse surface.

6. The lighting device according to claim 1, wherein the material of the lightguide contains a predetermined quantity of an additive to decrease direct transmissivity of light and increase a lateral component of the light beam, in dependence on a length of the lightguide.

7. A lighting device for a motor vehicle, comprising:
a light source for sending out a light beam; and
a lightguide of elongated shape, the light source attached to an end of the lightguide, the lightguide comprising a plastic, primarily transparent, material for guiding the light beam, while an outer surface portion of a mantle of the lightguide forms an exit surface that extends along at least a portion of a length of the lightguide for emergence of rays of light of the light beam, wherein another outer surface portion of the mantle of the lightguide opposite the exit surface is at least partly provided with a diffuse means that forms a diffuse surface, the diffuse surface that extends continuously in correspondence with the exit surface along the portion of the length of the lightguide, the diffuse surface formed by a nontransparent coating or foil pressed against the mantle of the lightguide, or plastic primarily nontransparent material joined to the mantle, the diffuse surface having a width that varies along the portion of the length of the lightguide.

8. The lighting device according to claim 7, wherein the width of the diffuse surface both increases and decreases in a direction (a) of passage of the light beam through the lightguide from the light source along the portion of the length of the lightguide.

9. The lighting device according to claim 7, wherein the width of the diffuse surface increases in a direction (a) of passage of the light beam through the lightguide from the light source along the portion of the length of the lightguide.

10. The lighting device according to claim 7, wherein the lightguide has a shape of a slab with one exit surface for emergence of the light rays, and a diffuse surface formed by the diffuse means on the opposite outer surface is a smaller part of the opposite back surface.

11. The lighting device according to claim 7, wherein the portion of the mantle of the lightguide forming the exit surface for emergence of the light rays has a cylindrical shape at least in a region of the diffuse surface.

12. The lighting device according to claim 7, wherein the material of the lightguide contains a predetermined quantity of an additive to decrease direct transmissivity of light and increase a lateral component of the light beam, in dependence on a length of the lightguide.

\* \* \* \* \*